US012517857B2

(12) United States Patent
Jin et al.

(10) Patent No.: US 12,517,857 B2
(45) Date of Patent: Jan. 6, 2026

(54) ELECTRONIC DEVICE HAVING A PLURALITY OF CHIPLETS

(71) Applicant: REBELLIONS INC., Seongnam-si (KR)

(72) Inventors: Young-Jae Jin, Seongnam-si (KR); Miock Chi, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/935,068

(22) Filed: Nov. 1, 2024

(65) Prior Publication Data

US 2025/0181540 A1  Jun. 5, 2025

(30) Foreign Application Priority Data

Dec. 4, 2023   (KR) .................. 10-2023-0173828
Sep. 2, 2024   (KR) .................. 10-2024-0118431

(51) Int. Cl.
*G06F 13/14*  (2006.01)
*G06F 11/30*  (2006.01)
(Continued)

(52) U.S. Cl.
CPC ...... *G06F 13/4068* (2013.01); *G06F 11/3006* (2013.01); *G06F 11/3051* (2013.01); *G06F 11/348* (2013.01); *G06F 13/14* (2013.01); *G06F 13/1673* (2013.01); *G06F 13/28* (2013.01); *G06F 13/36* (2013.01); *G06F 13/4031* (2013.01); *G06F 13/409* (2013.01);
(Continued)

(58) Field of Classification Search
CPC .................. G06F 13/4068; G06F 2213/40
See application file for complete search history.

(56) References Cited

U.S. PATENT DOCUMENTS 8,401,821 B1 *   3/2013  Sertamo .............. G06F 11/349
                                                 702/182
2007/0174472 A1 *  7/2007  Kulakowski ....... H04L 63/1466
                                                 709/229
(Continued)

FOREIGN PATENT DOCUMENTS

| KR | 10-2017-0092951 A | 8/2017 |
| KR | 10-2022-0148085 A | 11/2022 |
| KR | 10-2023-0038082 A | 3/2023 |

*Primary Examiner* — Henry Tsai
*Assistant Examiner* — Kim T Huynh
(74) *Attorney, Agent, or Firm* — BROADVIEW IP LAW, PC

(57) ABSTRACT

Provided is an electronic device, in which a first management module of a first chiplet generates a first request transaction for measuring a latency between the first chiplet and a second chiplet, and transmits the generated first request transaction to the second chiplet through a first interconnect module of the first chiplet, a second management module of the second chiplet generates a first response transaction corresponding to the first request transaction, and transmits the generated first response transaction to the first chiplet through a second interconnect module of the second chiplet, and the latency between the first chiplet and the second chiplet is determined based on a first time at which the first request transaction is generated in the first chiplet and a second time at which the first chiplet receives the first response transaction.

19 Claims, 15 Drawing Sheets

(51) Int. Cl.
*G06F 11/34* (2006.01)
*G06F 13/16* (2006.01)
*G06F 13/28* (2006.01)
*G06F 13/36* (2006.01)
*G06F 13/40* (2006.01)
*H01L 23/538* (2006.01)
*H01L 25/065* (2023.01)

(52) U.S. Cl.
CPC ...... *H01L 23/5382* (2013.01); *H01L 23/5385* (2013.01); *H01L 25/0655* (2013.01); *G06F 2213/0026* (2013.01); *G06F 2213/40* (2013.01)

(56) References Cited

U.S. PATENT DOCUMENTS

| | | |
|---|---|---|
| 2017/0228169 A1 | 8/2017 | Seong et al. |
| 2022/0350755 A1 | 11/2022 | Hahn et al. |
| 2023/0027585 A1* | 1/2023 | Weng .................... H04L 45/745 |
| 2023/0080284 A1 | 3/2023 | Lee |
| 2025/0085856 A1* | 3/2025 | Yoo ...................... G02B 6/4246 |
| 2025/0181540 A1* | 6/2025 | Jin ........................ G06F 13/409 |

\* cited by examiner

| source node address | destination node address | transaction ID | transaction request time |

| source node address | destination node address | transaction ID |

| register 800 | | 810 |
|---|---|---|
| transaction ID | transaction request time | |
| 4567A89B | time 1 | |
| 1A2B3C4D | time 2 | |
| 9F8E7D6C | time 3 | |
| ⋮ | ⋮ | |

ELECTRONIC DEVICE HAVING A PLURALITY OF CHIPLETS

CROSS-REFERENCE TO RELATED APPLICATIONS

This application claims priority to Korean Patent Application No. 10-2023-0173828, filed in the Korean Intellectual Property Office on Dec. 4, 2023, and Korean Patent Application No. 10-2024-0118431, filed in the Korean Intellectual Property Office on Sep. 2, 2024, the entire contents of which are hereby incorporated by reference.

BACKGROUND

Field

The present disclosure relates to an electronic device including a plurality of chiplets.

Description of Related Art

The demand for high performance and miniaturization of semiconductor devices and electronic products using the same has increased, leading to the development of various packaging technologies related to the semiconductor devices. Along with the development of these technologies, packaging technologies using chiplets have recently emerged.

Chiplet system may refer to a system that is provided by, rather than configuring chips performing various functions on one die (or substrate), dividing the chips in units of functionalities, configuring the divided chips on each of a plurality of dies (chiplet), and packaging them into one system. That is, the chiplet system was developed to overcome the limitations of existing monolithic chips, and these chiplets can be divided into functional units and miniaturized, thus overcoming the size limit of reticles which serve as the templates to print circuits on the wafer surface using light in the semiconductor photolithography process. In addition, since the yield of semiconductor manufacturing tends to be inversely proportional to the area, use of the chiplet can enhance the yield of semiconductor manufacturing and reduce manufacturing costs. Accordingly, in recent years, there is an increasing demand for using the chiplet when manufacturing electronic products.

Meanwhile, after the chiplet system is manufactured, because the die-to-die interface is not provided with pins, etc. that allow external access, it is difficult to check the performance of the chiplet interconnect, whether it is operating normally, etc.

SUMMARY

In order to solve one or more problems (e.g., the problems described above and/or other problems not explicitly described herein), the present disclosure provides an electronic device including a plurality of chiplets.

The present disclosure may be implemented in a variety of ways, including methods, devices (systems) and/or computer programs stored in computer readable storage media.

The electronic device may include a first chiplet including a first management module and a first interconnect module, and a second chiplet including a second management module and a second interconnect module and connected to the first interconnect module of the first chiplet through the second interconnect module, in which the first management module may be configured to generate a first request transaction for measuring a latency between the first chiplet and the second chiplet, and transmit the generated first request transaction to the second chiplet through the first interconnect module, the second management module may be configured to generate a first response transaction corresponding to the first request transaction, and transmit the generated first response transaction to the first chiplet through the second interconnect module, and the latency between the first chiplet and the second chiplet may be determined based on a first time at which the first request transaction is generated in the first chiplet and a second time at which the first chiplet receives the first response transaction.

The second management module may include an output controller connected to a bus interface of the second chiplet, a request transaction generator connected to the output controller, and a response transaction generator connected to the output controller, the request transaction generator may be configured to receive the first request transaction, generate a request transaction corresponding to the first request transaction, and transmit the request transaction to the output controller, the output controller may be configured to transmit the request transaction corresponding to the first request transaction to the response transaction generator, and the response transaction generator may be configured to generate a first response transaction based on the request transaction corresponding to the first request transaction.

The first request transaction and the first response transaction may include unique identification information of the first request transaction.

The first chiplet may be configured to store, in a register, information associated with a generation time and the unique identification information of each transaction generated in the first chiplet, in response to receiving the first response transaction, extract, from the register, the information associated with the generation time of the first request transaction by using the unique identification information of the first request transaction included in the received first response transaction, acquire a first time from the information associated with the extracted generation time of the first request transaction, and determine the latency by comparing the second time with the acquired first time.

Each of the first request transaction and the first response transaction may further include information associated with the first time.

The first chiplet may be configured to acquire a first time from a first response transaction including the information associated with the first time, and determine the latency by comparing the second time with the acquired first time.

The first request transaction may include a plurality of request transactions, the second response transaction may include a plurality of response transactions corresponding to the plurality of request transactions, and the latency between the first chiplet and the second chiplet may be an average or a maximum value of a plurality of latency values calculated based on times at which a plurality of request transactions are generated in the first chiplet and times at which the first chiplet receives the plurality of response transactions.

The second management module may be configured to generate a second request transaction for measuring a latency between the first chiplet and the second chiplet, and transmit the generated second request transaction to the first chiplet through the second interconnect module, the first management module may be configured to generate a second response transaction corresponding to the second request transaction, and transmit the generated second response transaction to the second chiplet through the first interconnect module, and the latency between the first chiplet and the second chiplet may be determined based on the first time, the second time, a third time at which the second request transaction is generated, and a fourth time at which the second chiplet receives the second response transaction.

In response to determining that the determined latency is equal to or greater than a threshold time, it may be determined that at least one of the first interconnect module or the second interconnect module operates abnormally.

In response to determining that the determined latency is equal to or greater than the threshold time, an interrupt signal may be transmitted to a host connected to the electronic device.

The first management module may include an output controller connected to the first interconnect module, a request transaction generator connected to the output controller, and a response transaction generator connected to the output controller, in response to determining that the determined latency is equal to or greater than the threshold time, the request transaction generator may be configured to generate a third request transaction and transmit the third request transaction to the output controller, the output controller may be configured to transmit the third request transaction to the response transaction generator, the response transaction generator may be configured to generate a third response transaction corresponding to the third request transaction, and whether the first management module operates abnormally or not may be determined based on the time at which the third request transaction is generated and the time at which the third response transaction is generated.

The second management module may include an output controller connected to a bus interface of the second chiplet, a request transaction generator connected to the second interconnect module, and a response transaction generator connected to the output controller, in response to determining that the determined latency is equal to or greater than a threshold time, the request transaction generator may generate a fourth request transaction and transmit the fourth request transaction to the output controller, the output controller may transmit the fourth request transaction to the response transaction generator, the response transaction generator may generate a fourth response transaction corresponding to the fourth request transaction, and whether the second management module operates abnormally or not may be determined based on a time at which the fourth request transaction is generated and a time at which the fourth response transaction is generated.

In response to receiving a command for measuring a latency between the first chiplet and the second chiplet and to completion of processing a transaction in progress in the first chiplet and the second chiplet, the first management module may generate the first request transaction.

The electronic device may further include one or more chiplets connected to the first chiplet and the second chiplet, in which the first chiplet, the one or more chiplets, and the second chiplet may be connected to each other in a connection including a serial path, and information associated with the first request transaction and information associated with the first response transaction may be transmitted through the serial path.

The first request transaction may include address information of the first chiplet in which the first request transaction is generated and address information of the second chiplet in which the first response transaction is to be generated.

The electronic device may further include a third chiplet connected to the first chiplet and the second chiplet, in which the third chiplet may include a third interconnect module connected to the first interconnect module and a fourth interconnect module connected to the second interconnect module, and in response to determining that the determined latency is equal to or greater than a threshold time, it may be determined that at least one of the first interconnect module, the second interconnect module, the third interconnect module, or the fourth interconnect module operates abnormally.

The third chiplet may further include a third management module connected to the third interconnect module, in response to determining that the determined latency is equal to or greater than the threshold time, the first management module may be configured to generate a fifth request transaction for measuring a latency between the first chiplet and the third chiplet, and transmit the generated fifth request transaction to the third chiplet through the first interconnect module, the third management module may be configured to generate a fifth response transaction corresponding to the fifth request transaction, and transmit the generated fifth response transaction to the first chiplet through the third interconnect module, the latency between the first chiplet and the third chiplet may be determined based on a time at which the fifth request transaction is generated in the first chiplet and a time at which the first chiplet receives the fifth response transaction, and in response to determining that the latency between the first chiplet and the third chiplet is equal to or greater than the threshold time, it may be determined that at least one of the first interconnect module or the third interconnect module operates abnormally.

The third chiplet may further include a fourth management module connected to the fourth interconnect module, in response to determining that the determined latency is equal to or greater than the threshold time, the first management module may be configured to generate a sixth request transaction for measuring a latency between the second chiplet and the third chiplet, and transmit the generated sixth request transaction to the second chiplet through the fourth interconnect module, the second management module may be configured to generate a sixth response transaction corresponding to the sixth request transaction, and transmit the generated sixth response transaction to the third chiplet through the second interconnect module, and the latency between the second chiplet and the third chiplet may be determined based on a time at which the sixth request transaction is generated in the third chiplet and a time at which the third chiplet receives the sixth response transaction, and in response to determining that the latency between the determined second chiplet and the third chiplet is equal to or greater than the threshold time, it may be determined that at least one of the second interconnect module or the fourth interconnect module operates abnormally.

The first interconnect module and the second interconnect module may be UCIe modules communicating with each other based on a Universal Chiplet Interconnect Express (UCIe) protocol.

At least one of the first chiplet or the second chiplet may further include a PCIe module configured to communicate with the host based on a Peripheral Component Interconnect Express (PCIe) protocol.

According to some aspects of the present disclosure, the latency between the chiplets and whether the operation is normal or not can be determined without requiring a means of external access to die-to-die between chiplets.

According to some aspects of the present disclosure, even after the electronic device packaging, chip sorting can be easily performed, and a compliance test and a health check of a die-to-die interface can be easily performed.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

Aspects of the present disclosure will be described with reference to the accompanying drawings described below, where similar reference numerals indicate similar elements, although the aspects are not limited thereto, in which:

FIG. 5 is a diagram illustrating an example of information included in a transaction;

FIG. 7 is a diagram illustrating an example of information included in a transaction according to another aspect;

FIG. 8 is a diagram illustrating an example of information stored in a register of a chiplet;

DETAILED DESCRIPTION

Figure 1:
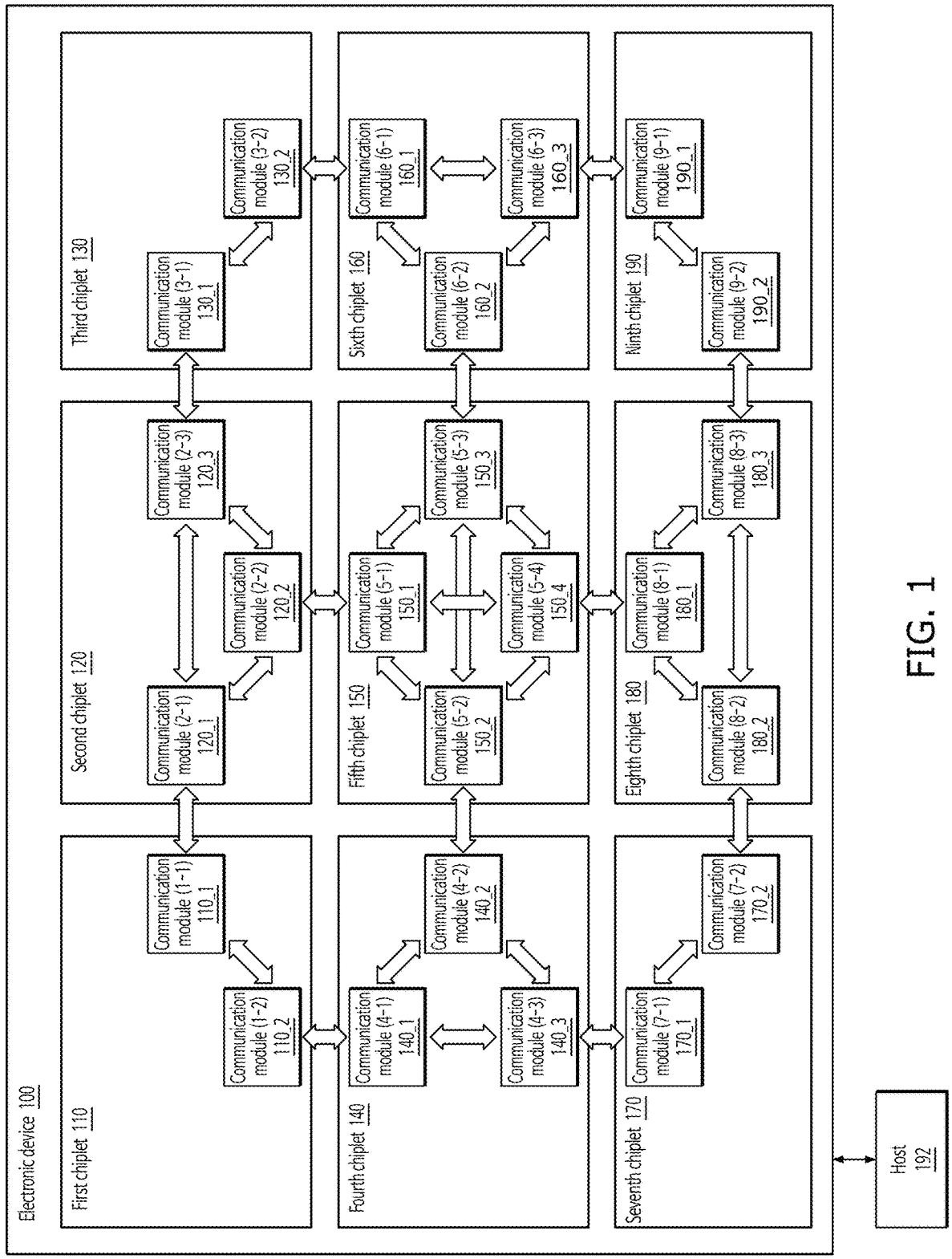
FIG. 1 is a diagram illustrating an example of an electronic device.

Hereinafter, example details for the practice of the present disclosure will be described in detail with reference to the accompanying drawings. However, in the following description, detailed description of well-known functions or configurations will be omitted when it may make the subject matter of the present disclosure rather unclear.

In the accompanying drawings, the same reference numerals are assigned to the same or corresponding components. In addition, in the following description of various examples, duplicate descriptions of the same or corresponding components may be omitted. However, even if the description of the component is omitted, it is not intended that such a component is not included in any aspect.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and these may be altered according to the intent of one skilled in the art, related practice, case law or the emergence of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Throughout the description, when a portion is stated as "comprising (including)" an element, unless specified to the contrary, it intends to mean that the portion may additionally include another element, rather than excluding the same.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Thus, as an example, the "module" or "unit" may include components such as software components, object-oriented software components, class components, and task components, and at least one of processes, functions, attributes, procedures, subroutines, segments of program code, drivers, firmware, micro-codes, circuits, data, database, data structures, tables, arrays, or variables. Functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, etc. Under some circumstances, the "processor" may refer to an application-specific integrated circuit (ASIC), a programmable logic device (PLD), a field-programmable gate array (FPGA), and so on. The "processor" may refer to a combination of processing devices such as a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the corresponding components are not limited by the terms.

In addition, in some aspects described below, when a certain component is stated as being "connected", "combined" or "coupled" to another component, it is to be understood that there may be yet another intervening component "connected", "combined" or "coupled" between the two components, although the two components may also be directly connected, combined or coupled to each other.

In addition, in some aspects described below, the expression "comprises" and/or "comprising" does not foreclose the presence or addition of one or more other components, steps, operations, and/or devices in addition to the recited components, steps, operations, or devices.

In addition, in some aspects described below, the expression "each of a plurality of A's" may refer to each of all components included in the plurality of A's, or may refer to each of some of the components included in the plurality of A's.

In the present disclosure, a "chiplet" is an integrated circuit (IC) block, which may be a type of semiconductor device that may be combined/connected/coupled with other chiplets to configure one package.

In the present disclosure, a "source node" may refer to a chiplet or a part of a chiplet from which transmission of specific information or data (e.g., transaction) starts. For example, a source node may first generate a request transaction for a specific purpose (e.g., for latency measurement) and transmit the request transaction to another chiplet.

In the present disclosure, a "relay node" may refer to a chiplet or part of a chiplet that receives information or data from a source node or another relay node and transmits the information to another relay node or to a destination node.

In the present disclosure, the "destination node" may refer to a chiplet or part of a chiplet that receives information or data from a source node or a relay node and processes the same. For example, the destination node may receive the request transaction generated at the source node or a corresponding request transaction and process the same to generate a response transaction.

Hereinafter, various aspects of the present disclosure will be described in detail with reference to the accompanying drawings.

FIG. 1 is a diagram illustrating an example of an electronic device 100. Referring to FIG. 1, the electronic device 100 may include a plurality of chiplets. For example, the electronic device 100 may include a first chiplet 110, a second chiplet 120, a third chiplet 130, a fourth chiplet 140, a fifth chiplet 150, a sixth chiplet 160, a seventh chiplet 170, an eighth chiplet 180, and a ninth chiplet 190. However, the number of chiplets included in the electronic device 100 is not limited to the above. According to various aspects, at least one of the chiplets mentioned above may be omitted from the electronic device 100, and the electronic device 100 may further include at least one other chiplet. In addition, the arrangement of chiplets included in the electronic device 100 is not limited to those illustrated herein, and the chiplets may be arranged in various other ways according to the purpose. The electronic device 100 including a plurality of chiplets may be packaged, and thus may be referred to as a packaged device or a chiplet system.

Each of the plurality of chiplets may include various components such as a processing core, a memory, an input/output (I/O) interface, a power management circuit, a control logic, an Analog-to-Digital Converter (ADC), a Digital-to-Analog Converter (DAC), a memory, etc. Each of the plurality of chiplets may include one or more communication modules. Each of the plurality of chiplets may include one or more communication modules capable of communicating with each of the other chiplets adjacent to each of the plurality of chiplets. For example, the first chiplet 110 may include a communication module (1-1) 110_1 and a communication module (1-2) 110_2, and the second chiplet 120 may include a communication module (2-1) 120_1, a communication module (2-2) 120_2, and a communication module (2-3) 120_3. In addition, the fifth chiplet 150 may include a communication module (5-1) 150_1, a communication module (5-2) 150_2, a communication module (5-3) 150_3, and a communication module (5-4) 150_4. A chiplet including the same number of communication modules may be implemented in the same architecture. For example, the fourth chiplet 140 and the sixth chiplet 160 may be implemented in the same architecture, but may be combined with different chiplets in different directions. For example, a communication module (4-1) 140_1 and a communication module (6-1) 160_1, a communication module (4-2) 140_2 and a communication module (6-2) 160_2, and a communication module (4-3) 140_3 and a communication module (6-3) 160_3 may correspond to each other.

Alternatively, each of the plurality of chiplets may include the same number of communication modules. For example, like the fifth chiplet 150, each of the plurality of chiplets included in the electronic device 100 may include four communication modules, although communication modules in the directions where there is no adjacent chiplet are not shown in FIG. 1 for convenience of explanation.

The communication module may include a controller and a PHY layer. Additionally, the communication module may include a management module, an interconnect module, etc., which will be described below with reference to FIG. 3, etc.

Each of the plurality of chiplets may be connected to each other through the communication module and the interconnect interface (indicated by an arrow between communication modules of different chiplets in FIG. 1). For example, the fifth chiplet 150 and the eighth chiplet 180 may be connected to each other via the communication module (5-4) 150_4, a communication module (8-1) 180_1, and an interface. The interconnect interface between the chiplets may refer to a die-to-die interface, and may include, for example, Universal Chiplet Interconnect Express (UCIe), Bunch of Wires (BoW), etc.

Each of the communication modules in the plurality of chiplets may be connected to each other through a bus interface (indicated by arrows between communication modules in one chiplet in FIG. 1). For example, a communication module (3-1) 130_1 and a communication module (3-2) 130_2 in the third chiplet 130 may be connected to each other through a bus interface. Likewise, a communication module (9-1) 190_1 and a communication module (9-2) 190_2 in the ninth chiplet 190 may be connected to each other through a bus interface. Additionally, aspects are not limited to the communication between communication modules, and components in each chiplet may communicate with other components through a bus interface, etc. The bus interface may be an Advanced extensible Interface (AXI) type interface. For example, each of the communication modules in the plurality of chiplets may be connected to each other through an AXI Master port and an AXI Slave port, and each of the AXI Master port and the AXI Slave port may include a read port and a write port.

Information may be transmitted and received within the electronic device 100 using the communication module, the interconnect interface, and/or the bus interface of each of the plurality of chiplets. For example, if information is transmitted from the fourth chiplet 140 to the ninth chiplet 190, the information may be transmitted to the ninth chiplet 190 in the order of the communication module (4-3) 140_3, a communication module (7-1) 170_1, a communication module (7-2) 170_2, a communication module (8-2) 180_2, a communication module (8-3) 180_3, and a communication module (9-2) 190_2. Alternatively, if information is transmitted from the fourth chiplet 140 to the ninth chiplet 190, the information may be transmitted to the ninth chiplet 190 in the order of the communication module (4-2) 140_2, the communication module (5-2) 150_2, the communication module (5-3) 150_3, the communication module (6-2) 160_2, the communication module (6-3) 160_3, and the communication module (9-1) 190_1. The path for routing the information from a specific chiplet to another chiplet may be determined by the architecture of the chiplet system or may be determined by various routing algorithms such as the Dijkstra algorithm, the Bellman-Ford algorithm, etc., although aspects are not limited thereto.

Any one (e.g., the first chiplet 110) of the plurality of chiplets may be connected to an external device (e.g., a host 192) through a host interface. In this case, the other chiplets (e.g., the second chiplet 120, etc.) may be restricted from the communication with external devices. The chiplet (e.g., the first chiplet 110) communicating with the external device may be referred to as a main chiplet, a primary die, a base chiplet, etc., and the other chiplets (e.g., the second chiplet 120, etc.) with restricted communication with the external device may be referred to as sub-chiplets, secondary dies, partner chiplets, etc. A host interface connecting the host 192 to the electronic device 100 or the main chiplet may include a Peripheral Component Interconnect Express (PCIe), etc.

The electronic device 100 including a plurality of chiplets, that is, the chiplet system may extend the functions of the host 192 (or the host system) and perform parallel processing for at least some functions. For example, the host 192 may manage the chiplet system and distribute tasks related to at least some functions to the chiplet system, and the chiplet system may process the distributed tasks in parallel. This not only enables the optimization and enhancement of the performance of the entire system including the host 192 and the chiplet system, but also provides a scalable computing environment. The chiplet system may perform functions of a multi-processor, a memory controller, a cache, a network interface, etc.

Figure 2A:
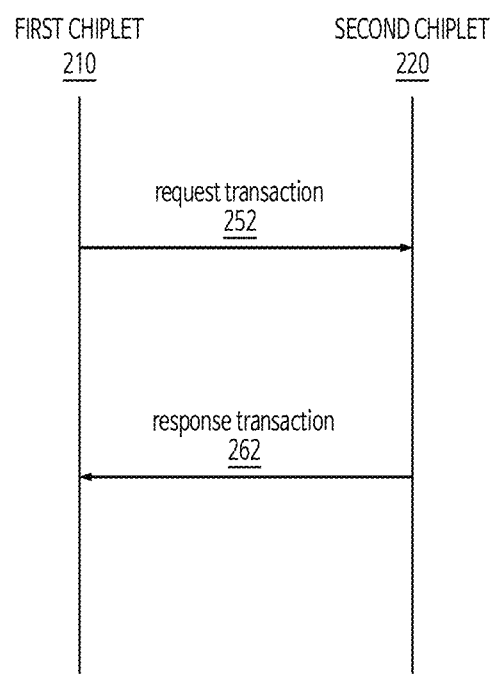
FIGS. 2A to 2C are diagrams illustrating examples in which transactions are transmitted and received to determine an inter-chiplet latency.
Figure 2B:
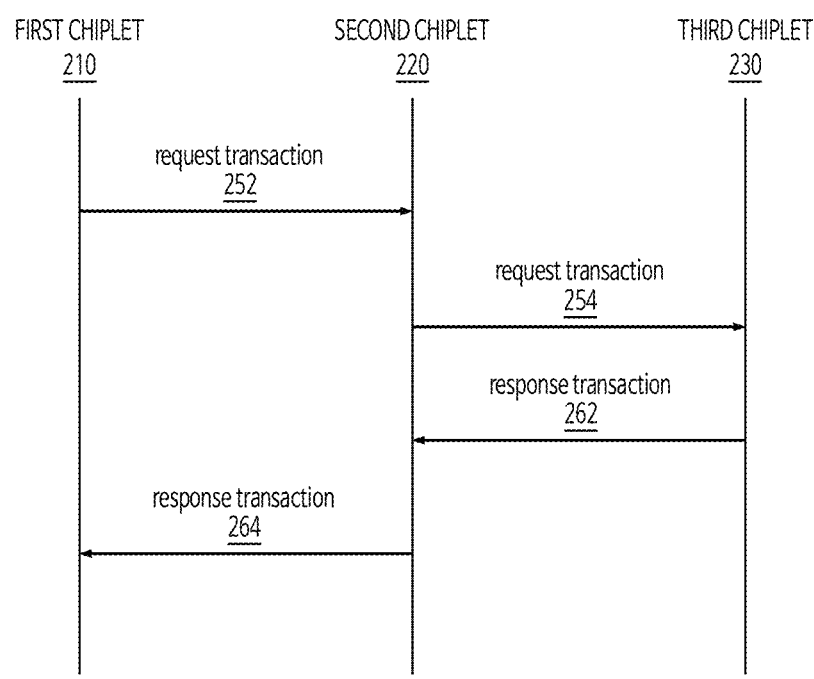
Figure 2C:
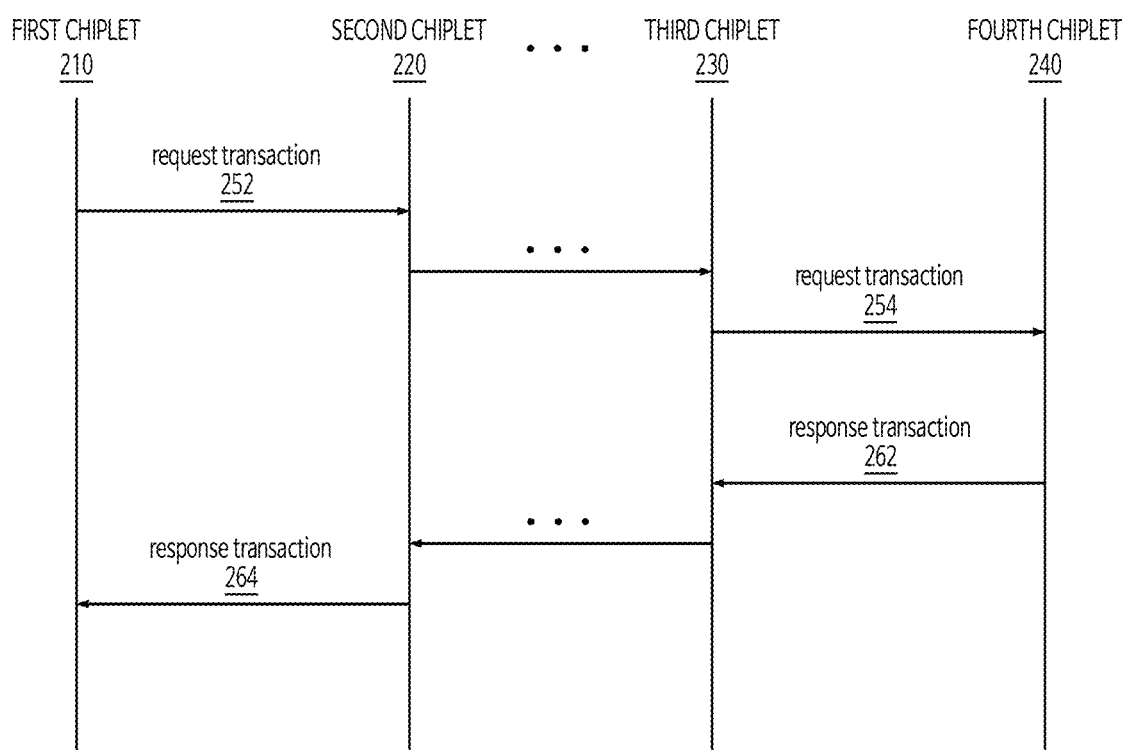

FIGS. 2A to 2C are diagrams illustrating examples in which transactions are transmitted and received to determine an inter-chiplet latency. Each of a first chiplet 210, a second chiplet 220, a third chiplet 230, and a fourth chiplet 240 illustrated in FIGS. 2A to 2C may be any one of the chiplets 110 to 190 illustrated and described with reference to FIG. 1.

Referring to FIG. 2A, the first chiplet 210 may generate a request transaction 252 and transmit the request transaction to the second chiplet 220 to measure a latency between the first chiplet 210 as a source node and the second chiplet 220 as a destination node. The second chiplet 220 may generate a response transaction 262 corresponding to the request transaction 252 and transmit the response transaction to the first chiplet 210.

The first chiplet 210 may calculate a latency between the first chiplet 210 and the second chiplet 220 based on the request transaction 252 and the received response transaction 262. For example, the time at which the request transaction 252 is generated and the time at which the response transaction 262 is received at the first chiplet 210 may be compared to calculate a latency.

Referring to FIG. 2B, in order to measure a latency between the first chiplet 210 as a source node and the third chiplet 230 as a destination node, the first chiplet 210 may generate the request transaction 252 and transmit the request transaction to the second chiplet 220 as a relay node.

The second chiplet 220 may generate a request transaction 254 corresponding to the request transaction 252 and transmit the request transaction 254 to the third chiplet 230. The request transactions 252 and 254 may be the same as each other or include the same information or data. For example, the request transactions 252 and 254 may include information associated with the time at which the request transaction 252 is generated at the first chiplet 210.

The third chiplet 230 may generate the response transaction 262 corresponding to the received request transaction 254 and transmit the response transaction 262 to the second chiplet 220. The second chiplet 220 may generate a response transaction 264 corresponding to the received response transaction 262 and transmit the response transaction 264 to the first chiplet 210. The response transactions 262 and 264 may be the same as each other or include the same information or data. For example, the response transactions 262 and 264 may include information associated with the time at which the request transaction 252 is generated at the first chiplet 210.

The first chiplet 210 may calculate a latency between the first chiplet 210 and the third chiplet 230 based on the request transaction 252 and the received response transaction 264. For example, the time at which the request transaction 252 is generated and the time at which the response transaction 264 is received at the first chiplet 210 may be compared to calculate a latency.

Referring to FIG. 2C, a plurality of chiplets 220 and 230 as relay nodes may be connected between the first chiplet 210 as a source node and the fourth chiplet 240 as a destination node. The relay nodes between the source node and the destination node may be connected to each other in a connection including a serial path. For example, if the relay nodes are the two chiplets 220 and 230 illustrated in FIG. 2C, there may be a path connected in series in the order of the first chiplet 210, the second chiplet 220, the third chiplet 230, and the fourth chiplet 240, and the transaction (request transaction and/or response transaction) or information associated with the transaction may be transmitted and received using that path.

Similarly to the process described above with reference to FIG. 2B, the first chiplet 210 may generate and transmit the request transaction 252 to the second chiplet 220, and the request transaction corresponding to the request transaction 252 may be generated in each of the plurality of chiplets 220 and 230 that are relay nodes, and the request transaction 254 may be transmitted to the fourth chiplet 240.

The fourth chiplet 240 may generate the response transaction 262 corresponding to the received request transaction 254. Similarly to the process described above with reference to FIG. 2B, the fourth chiplet 240 may transmit the response transaction 262 to the third chiplet 230, the request transaction corresponding to the response transaction 262 may be generated in each of the plurality of chiplets 220 and 230 that are relay nodes, and the response transaction 264 may be transmitted to the first chiplet 210.

The first chiplet 210 may calculate a latency between the first chiplet 210 and the fourth chiplet 240 based on the request transaction 252 and the received response transaction 264.

In response to determining that the latency calculated between the source node and the destination node is equal to or greater than a threshold time in FIGS. 2A to 2C, it may be determined that at least one of the interconnect modules of the chiplets in the path from the source node to the destination node is operating abnormally. For example, in the case of FIG. 2C, it may be determined that at least one of the interconnect module connecting the first chiplet 210 and the second chiplet 220, the interconnect module connecting the second chiplet 220 and the third chiplet 230, and the interconnect module connecting the third chiplet 230 and the fourth chiplet 240 operates abnormally.

In response to determining that the latency calculated between the source node and the destination node is equal to or greater than the threshold time, a latency measurement process for some of the paths from the source node to the destination node may be initiated. That is, a new source node and a destination node may be set, and the latency between the newly set source node and destination node may be measured. For example, in response to determining that the latency calculated between the first and fourth chiplets 210 and 240 in FIG. 2C is equal to or greater than the threshold time, a latency measurement process between the first and third chiplets 210 and 230 and/or between the second and fourth chiplets 210 and 240 may be initiated. In another example, a latency measurement process between the first chiplet 210 and the second chiplet 220, between the second chiplet 220 and the third chiplet 230, and between the third chiplet 230 and the fourth chiplet 240 may be initiated. Such a recursive algorithm may be repeated until an abnormally operating interconnect module in the electronic device is specified.

Figure 3:
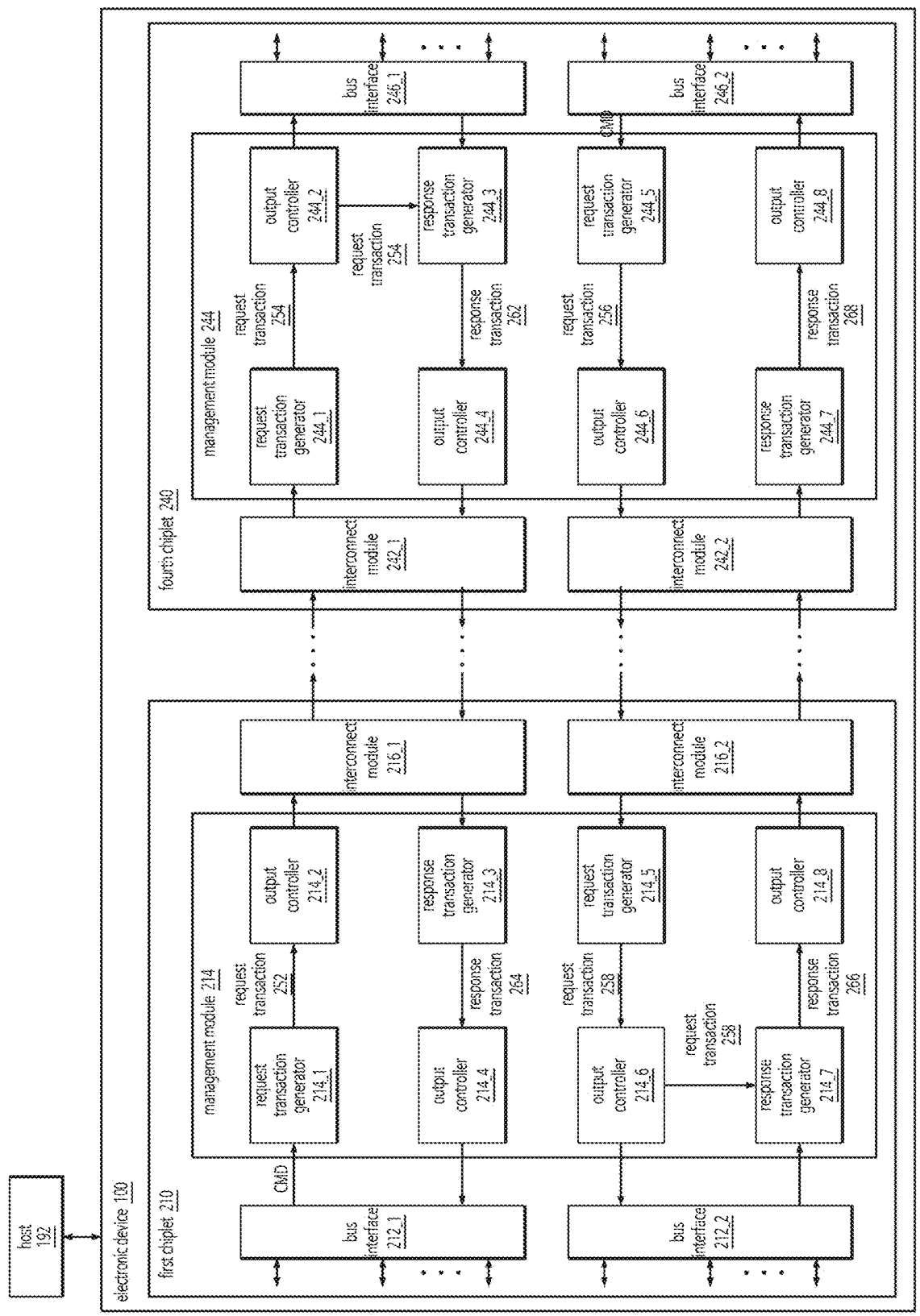
FIG. 3 is a diagram illustrating a detailed structure and an operation of a chiplet for measuring an inter-chiplet latency.

FIG. 3 is a diagram illustrating a detailed structure and operation of the chiplets 210 and 240 for measuring a latency between the chiplets 210 and 240. The first chiplet 210 may correspond to a source node and the fourth chiplet 240 may correspond to a destination node. One or more relay nodes may be connected between the first chiplet 210 and the fourth chiplet 240. Alternatively, the first chiplet 210 and the fourth chiplet 240 may be directly connected through an interconnect interface without a connected relay node.

As illustrated, the first chiplet 210 may include bus interfaces 212_1 and 212_2, a management module 214, and interconnect modules 216_1 and 216_2. The fourth chiplet 240 may include interconnect modules 242_1 and 242_2, a management module 244, and bus interfaces 246_1 and 246_2. It is illustrated that the interconnect modules 216_1 and 216_2 of the first chiplet 210 and the interconnect modules 242_1 and 242_2 of the fourth chiplet 240 each include two interconnect modules, but aspects are not limited thereto, and the interconnect modules may be configured as one interconnect module. Likewise, although it is illustrated that the bus interfaces 212_1 and 212_2 of the first chiplet 210 and the bus interfaces 246_1 and 246_2 of the fourth chiplet 240 each include two bus interfaces, aspects are not limited thereto, and the bus interfaces may be configured as one bus interface.

In the illustration of the internal components of the first chiplet 210 and the fourth chiplet 240 in FIG. 3, components other than those necessary to explain transmission and reception of information between the first chiplet 210 and the fourth chiplet 240 may be omitted. For example, the fourth chiplet 240 may further include another management modules and interconnect modules connected to the bus interfaces 246_1 and 246_2, and may thus be further connected to another chiplet adjacent to the fourth chiplet 240. In addition, the first chiplet 210 and the fourth chiplet 240 may further include various functional modules for performing various functions (e.g., calculation, recording, etc.).

The first chiplet 210 and the fourth chiplet 240 may transmit and receive information and data to and from each other through the interconnect modules 216_1, 216_2, 242_1, and 242_2. For example, if there is no relay node between the first chiplet 210 and the fourth chiplet 240, the interconnect modules 216_1 and 216_2 of the first chiplet 210 and the interconnect modules 242_1 and 242_2 of the fourth chiplet 240 may be connected to each other through an interconnect interface. On the other hand, if there are relay nodes between the first and fourth chiplets 210 and 240, the interconnect modules 216_1 and 216_2 of the first chiplet 210 and the interconnect modules 242_1 and 242_2 of the fourth chiplet 240 may be connected to any one of the relay nodes.

The interconnect modules 216_1, 216_2, 242_1, and 242_2 may include a UCIe module configured to communicate based on the Universal Chiplet Interconnect Express (UCIe) standard, and may each include a controller and a PHY module. At least one of the first chiplet 210 or the fourth chiplet 240 may further include a PCIe module (not illustrated) configured to communicate with the host 192 based on the Peripheral Component Interconnect Express (PCIe) protocol.

A request transaction generator 214_1 of the management module 214 in the first chiplet 210 may generate the request transaction 252 for measuring a latency between the first chiplet 210 and the fourth chiplet 240 and transmit the generated request transaction 252 to the fourth chiplet 240 through the interconnect module 216_1.

The request transaction generator 214_1 may generate the request transaction 252 in response to receiving a command CMD for latency measurement. The command CMD may be received from the host 192. The request transaction 252 may be generated in response to receiving the command CMD from the host 192 and to the completion of processing a transaction in progress (e.g., a transaction other than a latency measurement transaction) on a path connected from the first chiplet 210 to the fourth chiplet 240.

The request transaction generator 214_1 may transmit the generated request transaction 252 to an output controller 214_2 and the output controller 214_2 may transmit the generated request transaction 252 to the interconnect module 216_1 such that the request transaction 252 may be transmitted to the fourth chiplet 240.

The fourth chiplet 240 may receive the request transaction 252 generated in the first chiplet 210 (or the request transaction generated at the relay node in response to the request transaction 252) through the interconnect module 242_1. A request transaction generator 244_1 in the management module 244 of the fourth chiplet 240 may generate the request transaction 254 corresponding to the request transaction 252 generated in the first chiplet 210.

The request transaction generator 244_1 may transmit the generated request transaction 254 to an output controller 244_2. The output controller 244_2 may transmit the request transaction 254 to a response transaction generator 244_3. For example, in response to the request transaction 254 being a transaction for measuring an inter-chiplet latency, the output controller 244_2 may transmit the request transaction 254 to the response transaction generator 244_3 rather than to the bus interface 246_1. This will be described in detail below with reference to FIGS. 4A and 4B.

The response transaction generator 244_3 may generate the corresponding response transaction 262 based on the received request transaction 254, and transmit the generated response transaction 262 to an output controller 244_4 connected to the interconnect module 242_1. The output controller 244_4 may transmit the received response transaction 262 to the interconnect module 242_1, and the interconnect module 242_1 may transmit the response transaction 262 to the first chiplet 210.

In response to receiving the response transaction 262, the response transaction generator 214_3 in the management module 214 of the first chiplet 210 may generate the corresponding response transaction 264 and transmit the generated response transaction 264 to the output controller 214_4 connected to the bus interface 212_1.

The latency between the first chiplet 210 and the fourth chiplet 240 may be determined based on a first time at which the request transaction 252 is generated in the first chiplet 210 and a second time at which the first chiplet 210 receives the response transaction 262. For example, the latency between the first chiplet 210 and the fourth chiplet 240 may be a difference between the first time and the second time. The second time at which the first chiplet 210 receives the response transaction 262 may be defined in various ways such as a time at which the response transaction 262 is received from the interconnect module 216_1 of the first chiplet 210, a time at which the response transaction 262 is received from the management module 214, a time at which the response transaction generator 214_3 of the management module 214 generates the response transaction 264, or a time at which the response transaction 264 generated by the response transaction generator 214_3 is transmitted to the outside of the management module 214 through the output controller 214_4, and this may be similarly applied to other aspects.

Additionally or alternatively, in the aspect in which the request transaction 252 is generated in the first chiplet 210, the corresponding response transaction 262 is received, and the latency is measured, a request transaction 256 for latency measurement between the first chiplet 210 and the fourth chiplet 240 may be generated in the fourth chiplet 240. For example, in response to receiving the command CMD for latency measurement, a request transaction generator 244_5 of the management module 244 in the fourth chiplet 240 may generate the request transaction 256.

The request transaction generator 244_5 may transmit the generated request transaction 256 to an output controller 244_6, and the output controller 244_6 may transmit the generated request transaction 256 to the interconnect module 242_2 such that the request transaction 256 may be transmitted to the first chiplet 210.

The first chiplet 210 may receive the request transaction 256 generated in the fourth chiplet 240 (or the request transaction generated in response to the request transaction 256 at the relay node) through the interconnect module 216_2. A request transaction generator 214_5 of the management module 214 of the first chiplet 210 may generate a request transaction 258 corresponding to the request transaction 256 generated in the fourth chiplet 240.

The request transaction generator 214_5 may transmit the generated request transaction 258 to an output controller 214_6. The output controller 214_6 may transmit the request transaction 258 to a response transaction generator 214_7. For example, in response to the request transaction 258 being a transaction for measuring an inter-chiplet latency, the output controller 214_6 may transmit the request transaction 258 to the response transaction generator 214_7 rather than to the bus interface 212_2. This will be described in detail below with reference to FIGS. 4A and 4B.

The response transaction generator 214_7 may generate a corresponding response transaction 266 based on the received request transaction 258 and transmit the generated response transaction 266 to an output controller 214_8 connected to the interconnect module 216_2. The output controller 214_8 may transmit the received response transaction 266 to the interconnect module 216_2, and the interconnect module 216_2 may transmit the response transaction 266 to the fourth chiplet 240.

In response to receiving the response transaction 266, the response transaction generator 244_7 in the management module 244 of the fourth chiplet 240 may generate the corresponding response transaction 268 and transmit the generated response transaction 268 to the output controller 244_8 connected to the bus interface 246_2.

The latency between the first chiplet 210 and the fourth chiplet 240 may be determined based on a third time at which the request transaction 256 is generated in the fourth chiplet 240 and a fourth time at which the fourth chiplet 240 receives the response transaction 266. For example, the latency between the first chiplet 210 and the fourth chiplet 240 may be a difference between the third time and the fourth time. Additionally, the latency between the first chiplet 210 and the fourth chiplet 240 may be calculated further based on the difference between the first time and the second time described above. For example, the latency between the first chiplet 210 and the fourth chiplet 240 may be determined as an average or weighted average of the difference between the first time and the second time and the difference between the third time and the fourth time.

Additionally, the request transaction 252 may include a plurality of request transactions, and the response transaction 262 may include a plurality of response transactions generated in response to the plurality of request transactions, and based on these, a plurality of latency values may be determined. In this case, the final latency may be determined as an average or maximum value of a plurality of determined latency values.

In response to determining that the determined latency is equal to or greater than a threshold time (e.g., a predetermined threshold time), it may be determined that at least some of the interconnect modules that transmitted and received the transactions for latency measurement between the first chiplet 210 and the fourth chiplet 240 operate abnormally. For example, when it is assumed that the relay node is not connected between the first chiplet 210 and the fourth chiplet 240, it may be determined that at least some of the interconnect modules 216_1, 216_2, 242_1, and 242_2 of the first chiplet 210 and the fourth chiplet 240 operate abnormally.

In response to determining that the determined latency is equal to or greater than the threshold time (e.g., the predetermined threshold time), an interrupt signal may be transmitted to the host 192 connected to the electronic device 100.

In the aspect described above with reference to FIG. 3, the latency between the chiplets and whether the operation is normal or not may be determined without requiring a means of external access to die-to-die between chiplets.

Figure 4A:
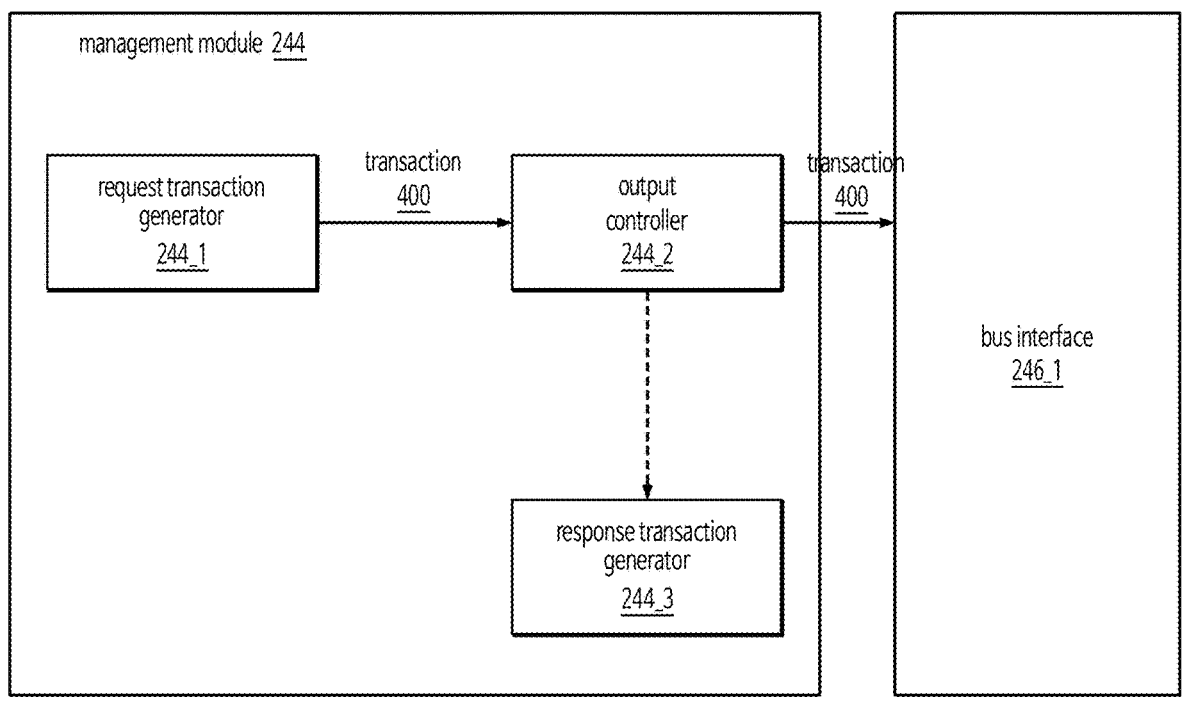
FIGS. 4A and 4B are diagrams illustrating an operation of an output controller in a management module.
Figure 4B:
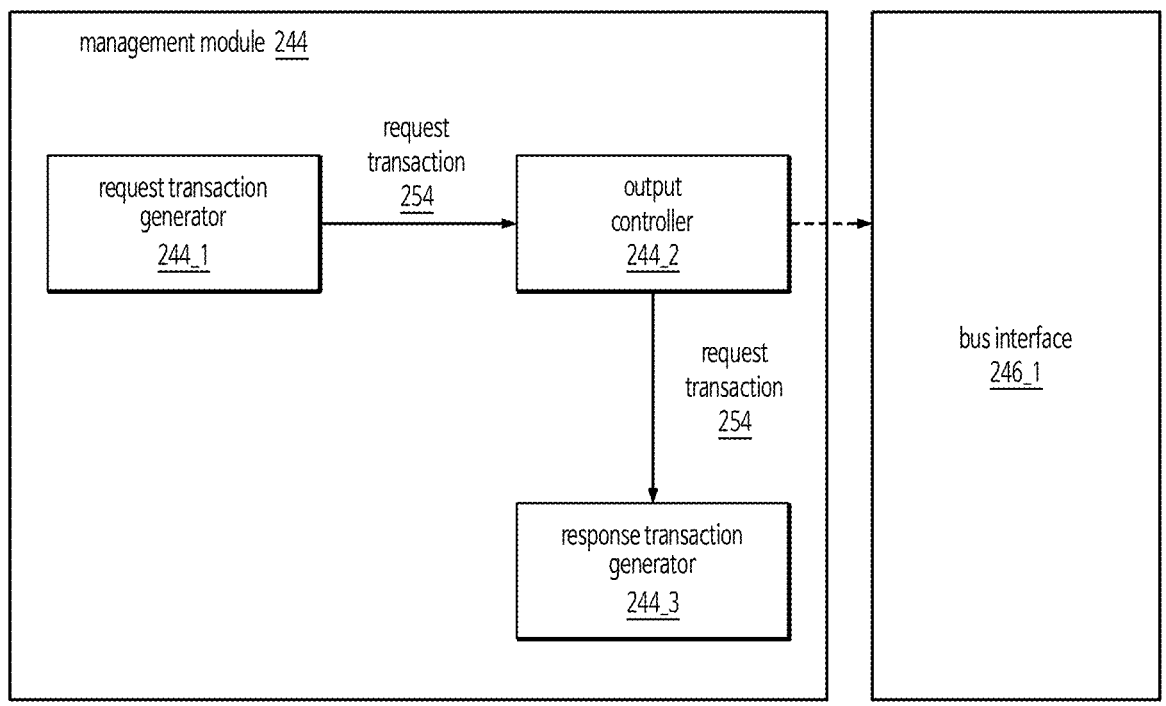

FIGS. 4A and 4B are diagrams illustrating the operation of the output controller 244_2 in the management module 244.

Referring to FIGS. 3 and 4A, if the electronic device 100 processes a transaction 400 other than the transaction for measuring the inter-chiplet latency, the output controller 244_2 may transmit the transaction 400 to the bus interface 246_1 of the fourth chiplet 240 to process the transaction 400 in the fourth chiplet 240 or transmit the transaction 400 to another chiplet.

On the other hand, referring to FIGS. 3 and 4B, in response to the fourth chiplet 240 being a destination node of the transaction for measuring the inter-chiplet latency in the electronic device 100, the output controller 244_2 may transmit the request transaction 254 to the response transaction generator 244_3 in the management module 244 rather than transmitting the request transaction 254 to the bus interface 246_1. That is, the inter-chiplet latency may be measured using only the interconnect module and the management module in the chiplet.

In response to receiving the command CMD for latency measurement between the first and fourth chiplets 210 and 240 and to the completion of processing the other transactions on the connection path between the first and fourth chiplets 210 and 240, the output controller 244_2 may change the transaction transfer path towards the response transaction generator 244_3.

Figure 6:
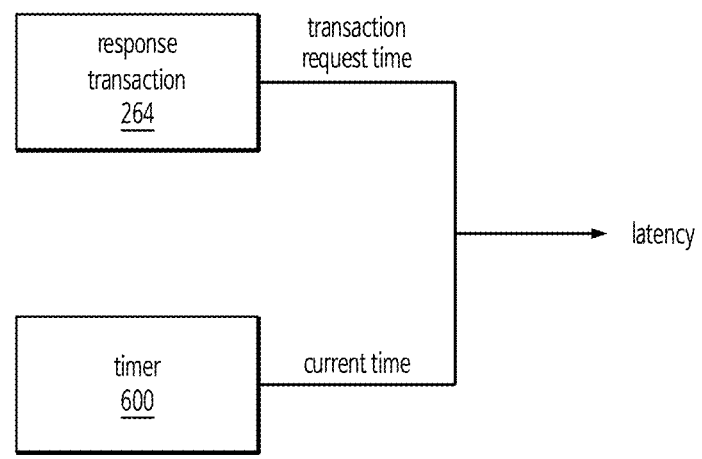
FIG. 6 is a block diagram illustrating an example in which an inter-chiplet latency is calculated based on information included in a response transaction.

FIG. 5 is a diagram illustrating an example of information included in a transaction 500, and FIG. 6 is a block diagram illustrating an example in which an inter-chiplet latency is calculated based on the information included in the response transaction 262.

Referring to FIG. 5, the transaction 500 (e.g., a request transaction, a response transaction) generated to measure an inter-chiplet latency may include information associated with a source node address, a destination node address, unique identification information of the transaction (transaction ID), and a transaction request time.

The request transactions 252, 254, 256, and 258 and the response transactions 262, 264, 266, and 268 described above with reference to FIG. 3 may be generated in the same format as the transaction 500 of FIG. 5. In addition, the request transactions 252, 254, 256, and 258 and the response transactions 262, 264, 266, and 268 may include the same information associated with the source node address, the destination node address, and/or the transaction request time. That is, this information may be transmitted intact from the source node to the destination node, although the transfer format may be changed in each transaction. The information associated with the transaction request time may be determined by referring to a timer value at the time of generation of the request transaction in the chiplet in which the request transaction is first generated.

When measuring the latency between directly connected chiplets (e.g., the first chiplet 110 and the second chiplet 120 of FIG. 1) without a connected relay node, the address information of the source 3node and the address information of the destination node may be omitted from the transaction 500.

Referring to FIG. 6, the information associated with the transaction request time may be extracted from the response transaction 262 transmitted back to the source node.

Meanwhile, a current time may be extracted from a timer 600 of the source node. The timer 600 may be implemented in hardware and/or software within the source node. In response to receiving the response transaction 262 at the source node, the current time at the time of receiving the response transaction 262 may be extracted from the timer 600.

The source node may determine the latency by comparing the current time extracted from the timer 600 with the transaction request time. For example, the latency may be determined as a difference between the transaction request time and the current time.

Figure 9:
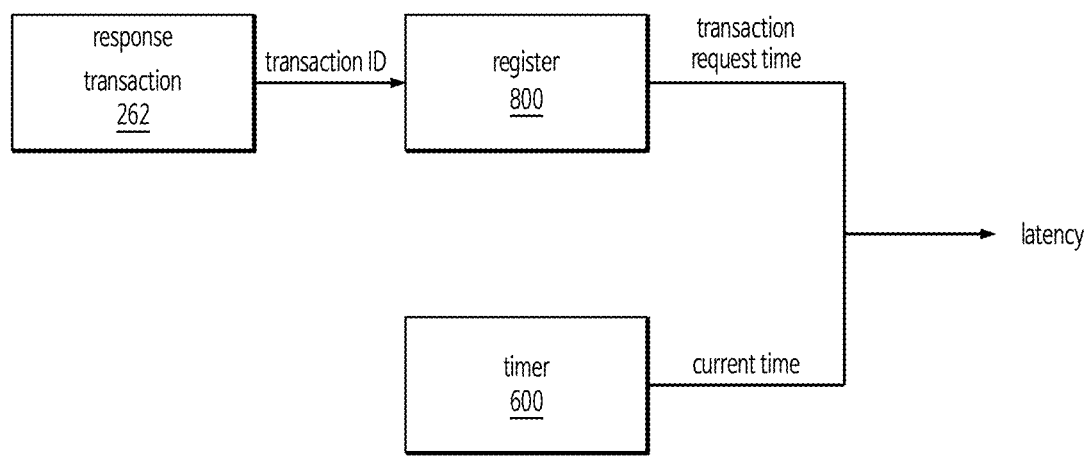
FIG. 9 is a block diagram illustrating an example in which an inter-chiplet latency is calculated based on information stored in a register.

FIG. 7 is a diagram illustrating an example of information included in a transaction 700 according to another aspect, FIG. 8 is a diagram illustrating an example of information 810 stored in a register 800 of the chiplet, and FIG. 9 is a block diagram illustrating an example in which an inter-chiplet latency is calculated based on the information stored in the register 800.

Referring to FIG. 7, unlike the transaction 500 of FIG. 5, the information associated with the transaction request time may not be included in the transaction 700 (e.g., a request transaction, a response transaction) generated for the measurement of inter-chiplet latency.

Referring to FIG. 8, when a first request transaction for latency measurement is generated, the information associated with the transaction request time may be stored in the register 800 within the source node where the request transaction is generated, together with the unique identification number of the request transaction.

The transaction request times (time 1, time 2, and time 3) may be stored in various formats. In one example, the transaction request time may be expressed as the number of clock cycles elapsed from a specific reference time point. For example, time 1, time 2, and time 3 of FIG. 8 are the number of clock cycles elapsed from a specific reference time point, respectively, and may be expressed as "10", "12", and "16". In another example, the transaction request time may be expressed in a timestamp format (e.g., 2024-06-21T14: 23:05.123Z) such as ISO 8601 time format.

Referring to FIG. 9, the unique identification information (transaction ID) of the request transaction first generated at the source node may be extracted from the response transaction 262 transmitted back to the source node, and the extracted unique identification information may be compared with the information stored in the register 800 so that a transaction request time corresponding to the unique identification information may be extracted from the register 800.

The current time extracted from the timer 600 of the source node may be compared with the transaction request time to determine the latency. For example, the latency may be determined as a difference between the transaction request time and the current time. For example, if the transaction request time is expressed as the number of clock cycles in FIG. 8, the latency may be calculated as the number of clock cycles between the transaction request time and the current time. For example, the latency may be calculated in the form of clock cycles 10 and 12, and may be converted into time units such as nanoseconds (ns), etc., using clock frequencies. Alternatively, if the transaction request time is expressed in a specific timestamp format, the latency may be directly calculated in time units such as nanoseconds, etc.

Figure 10A:
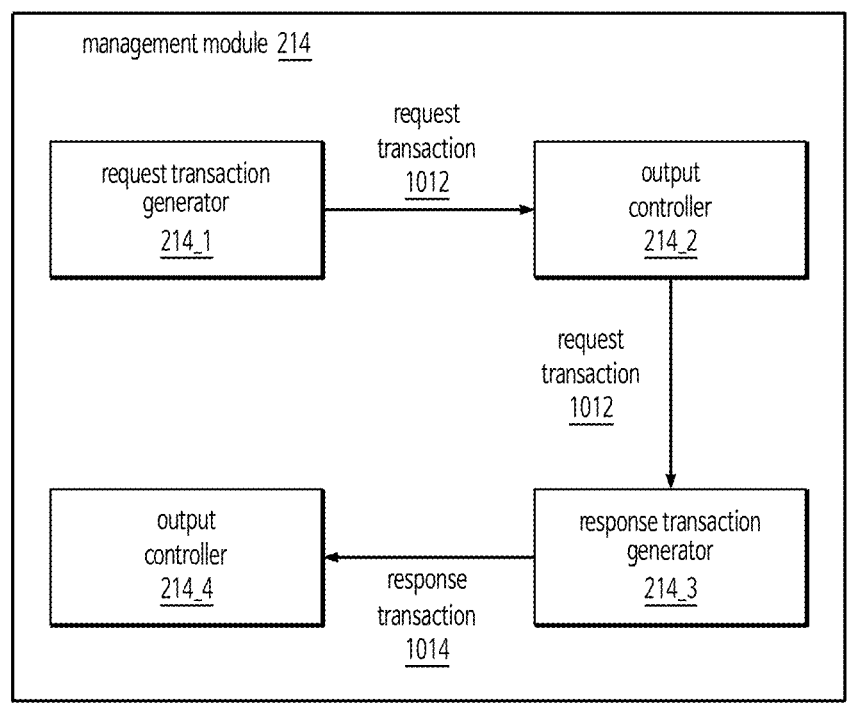
FIGS. 10A and 10B are diagrams illustrating an operation within a management module to determine whether the management module is operating abnormally.
Figure 10B:
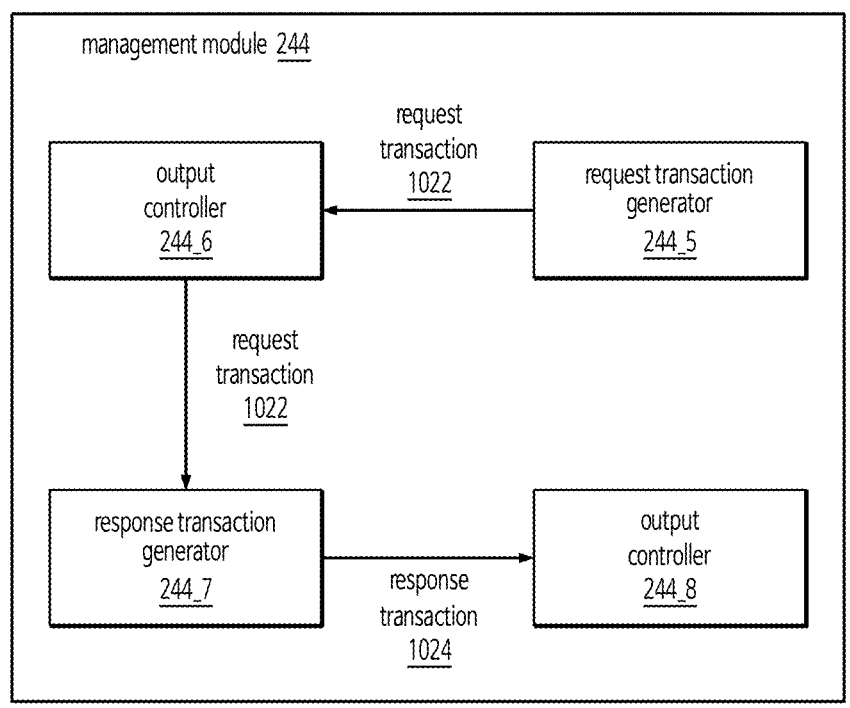

FIGS. 10A and 10B are diagrams illustrating operations in the management modules 214 and 244 for determining whether the management modules 214 and 244 operate abnormally. The operations within the management modules 214 and 244 described with reference to FIGS. 10A and 10B may be initiated in response to determining that the latency between chiplets each including the management modules 214 and 244 is equal to or greater than a threshold time. That is, this operation may be initiated to determine if the inter-chiplet latency is calculated to be equal to or greater than a threshold time due to the abnormal operation of the management modules 214 and 244.

Referring to FIG. 10A, the request transaction generator 214_1 may generate a request transaction 1012 for determining whether the management module 214 operates abnormally. The request transaction generator 214_1 may transmit the generated request transaction 1012 to the output controller 214_2. In response to the request transaction 1012 being a transaction for measuring an inter-chiplet latency, the output controller 214_2 may transmit the request transaction 1012 to the response transaction generator 214_3 rather than to the interconnect module (e.g., 216_1 of FIG. 3) connected to the management module 214 (inner loopback).

The response transaction generator 214_3 may generate a response transaction 1014 corresponding to the request transaction 1012. The response transaction generator 214_3 may transmit the generated response transaction 1014 to the output controller 214_4.

Whether the management module 214 operates abnormally or not may be determined based on the time at which the request transaction 1012 is generated and the time at which the response transaction 1014 is generated. For example, if a difference between the time at which the request transaction 1012 is generated and the time at which the response transaction 1014 is generated is equal to or greater than the threshold time, it may be determined that the management module 214 operates abnormally. In this case, it may be determined that the interconnect module between the chiplets each including the management modules 214 and 244 operates normally.

Referring to FIG. 10B, the request transaction generator 244_5 may generate a request transaction 1022 for determining whether the management module 244 operates abnormally. The request transaction generator 244_5 may transmit the generated request transaction 1022 to the output controller 244_6. In response to the request transaction 1022 being a transaction for measuring an inter-chiplet latency, the output controller 244_6 may transmit the request transaction 1022 to the response transaction generator 244_7 rather than to the interconnect module (e.g., 242_2 of FIG. 3) connected to the management module 244 (inner loopback).

The response transaction generator 244_7 may generate a response transaction 1024 corresponding to the request transaction 1022. The response transaction generator 244_7 may transmit the generated response transaction 1024 to the output controller 244_8.

Whether the management module 244 operates abnormally or not may be determined based on the time at which the request transaction 1022 is generated and the time at which the response transaction 1024 is generated. For example, if a difference between the time at which the request transaction 1022 is generated and the time at which the response transaction 1024 is generated is equal to or greater than the threshold time, it may be determined that the management module 244 operates abnormally. In this case, it may be determined that the interconnect module between the chiplets each including the management modules 214 and 244 operates normally.

Figure 11:
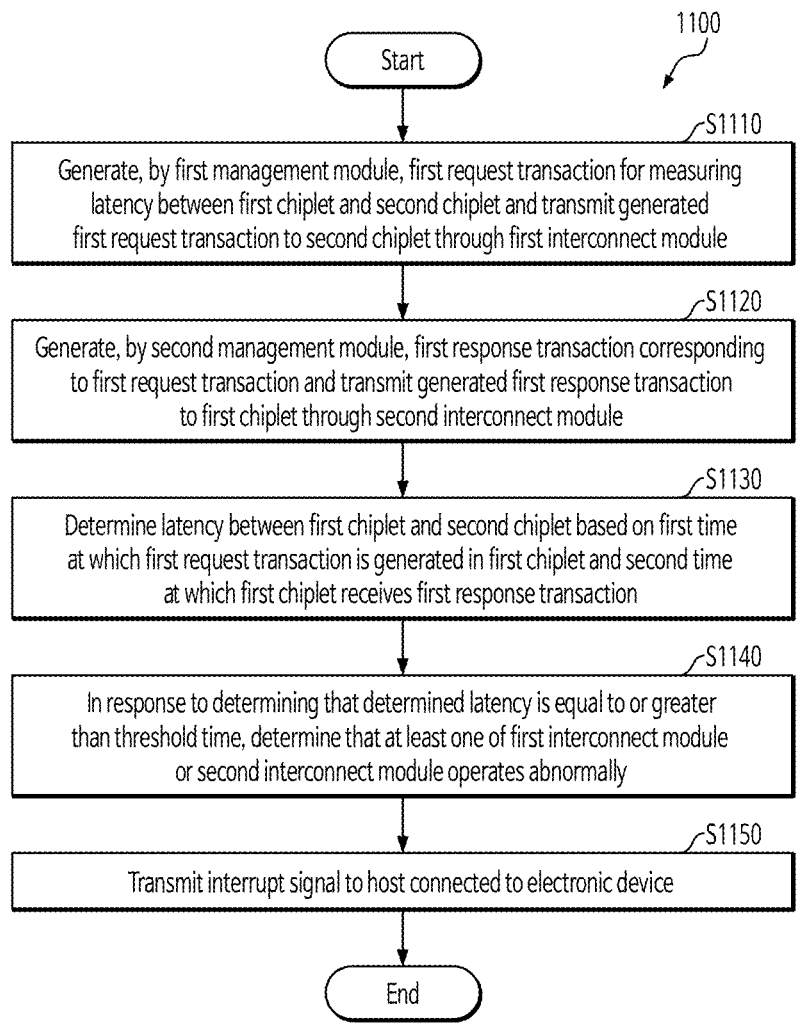
FIG. 11 is a flowchart provided to explain a method for determining whether chiplets are normally connected to each other.

FIG. 11 is a flowchart provided to explain a method 1100 for determining whether chiplets are normally connected to each other. The method 1100 may be performed in an electronic device including a plurality of chiplets. Each of the plurality of chiplets in the electronic device may include a management module and an interconnect module connected to another chiplet.

The first management module in the first chiplet of the electronic device may generate a first request transaction for measuring a latency between the first chiplet and the second chiplet and transmit the generated first request transaction to the second chiplet through the first interconnect module, at S1110. In response to receiving a command for measuring a latency between the first chiplet and the second chiplet and to the completion of processing the transaction in progress in the first chiplet and the second chiplet, the first management module may generate a first request transaction.

The second management module in the second chiplet of the electronic device may generate a first response transaction corresponding to the first request transaction and transmit the generated first response transaction to the first chiplet through the second interconnect module, at S1120. The second management module may include an output controller connected to the bus interface of the second chiplet, a request transaction generator connected to the output controller, and a response transaction generator connected to the output controller. The request transaction generator may receive the first request transaction, generate a request transaction corresponding to the first request transaction, and transmit the request transaction to the output controller. The output controller may transmit the request transaction corresponding to the first request transaction to the response transaction generator. The response transaction generator may generate a first response transaction based on the request transaction corresponding to the first request transaction.

The latency between the first chiplet and the second chiplet may be determined based on the first time at which the first request transaction is generated in the first chiplet and the second time at which the first chiplet receives the first response transaction, at S1130.

The first request transaction and the first response transaction may include unique identification information of the first request transaction. The first chiplet may store, in the register, information associated with a generation time and unique identification information of each transaction generated in the first chiplet. In response to receiving the first response transaction, the first chiplet may extract, from the register, the information associated with the generation time of the first request transaction by using the unique identification information of the first request transaction included in the received first response transaction, and acquire the first time from the extracted information associated with the generation time of the first request transaction. The first chiplet may determine the latency by comparing the second time with the acquired first time.

In another aspect, the first request transaction and the first response transaction may further include information associated with the first time. The first chiplet may acquire the first time from the first response transaction including the information associated with the first time, and determine the latency by comparing the second time with the acquired first time.

The first request transaction may include a plurality of request transactions, the second response transaction may include a plurality of response transactions corresponding to the plurality of request transactions, and the latency between the first chiplet and the second chiplet may be an average or a maximum value of a plurality of latency values calculated based on the time at which the plurality of request transactions are generated in the first chiplet and the time at which the first chiplet receives the plurality of response transactions.

Additionally or alternatively, the second management module may generate a second request transaction for measuring a latency between the first chiplet and the second chiplet, and transmit the generated second request transaction to the first chiplet through the second interconnect module. The first management module may generate a second response transaction corresponding to the second request transaction and transmit the generated second response transaction to the second chiplet through the first interconnect module. The latency between the first chiplet and the second chiplet may be determined based on the first time, the second time, a third time at which the second request transaction is generated, and a fourth time at which the second response transaction is received.

The first management module may include an output controller connected to the first interconnect module, a request transaction generator connected to the output controller, and a response transaction generator connected to the output controller, and the request transaction generator may generate a third request transaction and transmit the third request transaction to the output controller, in response to determining that the determined latency is equal to or greater than a threshold time. The output controller may transmit the third request transaction to the response transaction generator, and the response transaction generator may generate a third response transaction corresponding to the third request transaction. Whether the first management module operates abnormally or not may be determined based on the time at which the third request transaction is generated and the time at which the third response transaction is generated.

In another aspect, the second management module may include an output controller connected to the bus interface of the second chiplet, a request transaction generator connected to the second interconnect module, and a response transaction generator connected to the output controller, and the request transaction generator may generate a fourth request transaction and transmit the fourth request transaction to the output controller, in response to determining that the determined latency is equal to or greater than a threshold time. The output controller may transmit the fourth request transaction to the response transaction generator, and the response transaction generator may generate a fourth response transaction corresponding to the fourth request transaction. Whether the second management module operates abnormally or not may be determined based on the time at which the fourth request transaction is generated and the time at which the fourth response transaction is generated.

In response to determining that the latency determined at S1130 is equal to or greater than the threshold time, it may be determined that at least one of the first interconnect module or the second interconnect module operates abnormally, at S1140.

In response to determining that the determined latency is equal to or greater than the threshold time, an interrupt signal may be transmitted to a host connected to the electronic device, at S1150.

Meanwhile, one or more chiplets connected to the first and second chiplets may be further included in the electronic device, and the first chiplet, one or more chiplets, and the second chiplet may be connected to each other in a connection including a serial path. The information associated with the first request transaction and the information associated with the first response transaction may be transmitted through the serial path. In this case, the first request transaction may include address information of the first chiplet in which the first request transaction is generated and address information of the second chiplet in which the first response transaction is to be generated.

The third chiplet may include a third interconnect module connected to the first interconnect module and a fourth interconnect module connected to the second interconnect module, and in response to determining that the determined latency is equal to or greater than the threshold time, it may be determined that at least one of the first interconnect module, the second interconnect module, the third interconnect module, or the fourth interconnect module operates abnormally.

The third chiplet may further include a third management module connected to the third interconnect module, and in response to determining that the determined latency is equal to or greater than the threshold time, the first management module may generate a fifth request transaction for measuring a latency between the first chiplet and the third chiplet, and transmit the generated fifth request transaction to the third chiplet through the first interconnect module. The third management module may generate a fifth response transaction corresponding to the fifth request transaction, and transmit the generated fifth response transaction to the first chiplet through the third interconnect module, and the latency between the first chiplet and the third chiplet may be determined based on the time at which the fifth request transaction is generated in the first chiplet and the time at which the first chiplet receives the fifth response transaction. In response to determining that the latency between the first chiplet and the third chiplet is equal to or greater than the threshold time, it may be determined that at least one of the first interconnect module or the third interconnect module operates abnormally.

In another aspect, the third chiplet may further include a fourth management module connected to the fourth interconnect module, and in response to determining that the determined latency is equal to or greater than the threshold time, the fourth management module may generate a sixth request transaction for measuring a latency between the second chiplet and the third chiplet, and transmit the generated sixth request transaction to the second chiplet through the fourth interconnect module. The second management module may generate a sixth response transaction corresponding to the sixth request transaction and transmit the generated sixth response transaction to the third chiplet through the second interconnect module. The latency between the second chiplet and the third chiplet may be determined based on the time at which the sixth request transaction is generated in the third chiplet and the time at which the third chiplet receives the sixth response transaction. In response to determining that the latency between the determined second chiplet and the third chiplet is equal to or greater than the threshold time, it may be determined that at least one of the second interconnect module or the fourth interconnect module operates abnormally.

The flowchart illustrated in FIG. 11 and the above description are merely examples and may be implemented differently in some examples. For example, in FIG. 11, one or more operations may be omitted, the order of each operation may be changed, one or more operations may be performed in an overlapping manner, or one or more operations may be repeatedly performed several times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and operations have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The commands may be executable by one or more processors, and may cause the processor(s) to perform certain aspects of the functions described in the present disclosure.

If implemented in software, the techniques described above may be stored on a computer-readable medium as one or more commands or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may be present in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some aspects herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. An electronic device, comprising:
a first chiplet comprising a first management module and a first interconnect module; and
a second chiplet comprising a second management module and a second interconnect module and connected to the first interconnect module of the first chiplet through the second interconnect module, wherein
the first management module is configured to generate a first request transaction for measuring a latency between the first chiplet and the second chiplet, and transmit the generated first request transaction to the second chiplet through the first interconnect module,
the second management module is configured to generate a first response transaction corresponding to the first request transaction, and transmit the generated first response transaction to the first chiplet through the second interconnect module,
a latency between the first chiplet and the second chiplet is determined based on a first time at which the first request transaction is generated in the first chiplet and a second time at which the first chiplet receives the first response transaction,
the second management module is further configured to generate a second request transaction for measuring a latency between the first chiplet and the second chiplet, and transmit the generated second request transaction to the first chiplet through the second interconnect module,
the first management module is further configured to generate a second response transaction corresponding to the second request transaction, and transmit the generated second response transaction to the second chiplet through the first interconnect module, and the latency between the first chiplet and the second chiplet is determined based on the first time, the second time, a third time at which the second request transaction is generated, and a fourth time at which the second chiplet receives the second response transaction.

2. The electronic device according to claim 1, wherein the second management module comprises:
an output controller connected to a bus interface of the second chiplet;
a request transaction generator connected to the output controller; and
a response transaction generator connected to the output controller,
the request transaction generator is configured to receive the first request transaction, generate a request transaction corresponding to the first request transaction, and transmit the request transaction corresponding to the first request transaction to the output controller,
the output controller is configured to transmit the request transaction corresponding to the first request transaction to the response transaction generator, and
the response transaction generator is configured to generate, based on the request transaction corresponding to the first request transaction, the first response transaction.

3. The electronic device according to claim 1, wherein the first request transaction and the first response transaction comprise unique identification information of the first request transaction.

4. The electronic device according to claim 3, wherein the first chiplet is configured to:
store, in a register, information associated with a generation time and the unique identification information of each transaction generated in the first chiplet;
extract from the register, in response to receiving the first response transaction, the information associated with the generation time of the first request transaction by using the unique identification information of the first request transaction included in the received first response transaction;
acquire a first time from the extracted information associated with the generation time of the first request transaction; and
determine the latency by comparing the second time with the acquired first time.

5. The electronic device according to claim 3, wherein each of the first request transaction and the first response transaction further comprise information associated with the first time.

6. The electronic device according to claim 5, wherein the first chiplet is further configured to:
acquire a first time from a first response transaction comprising the information associated with the first time; and
determine the latency by comparing the second time with the acquired first time.

7. The electronic device according to claim 1, wherein the first request transaction comprises a plurality of request transactions,
the first response transaction comprises a plurality of response transactions corresponding to the plurality of request transactions, and
the latency between the first chiplet and the second chiplet is determined based on an average or a maximum value of a plurality of latency values calculated based on times at which the plurality of request transactions are generated in the first chiplet and times at which the first chiplet receives the plurality of response transactions.

8. The electronic device according to claim 1, wherein, in response to determining that the determined latency is equal to or greater than a threshold time, it is determined that at least one of the first interconnect module or the second interconnect module operates abnormally.

9. The electronic device according to claim 1, wherein, in response to determining that the determined latency is equal to or greater than a threshold time, an interrupt signal is transmitted to a host connected to the electronic device.

10. The electronic device according to claim 1, wherein the first management module comprises:
an output controller connected to the first interconnect module;
a request transaction generator connected to the output controller; and
a response transaction generator connected to the output controller,
in response to determining that the determined latency is equal to or greater than a threshold time, the request transaction generator is configured to generate a third request transaction and transmit the third request transaction to the output controller,
the output controller is configured to transmit the third request transaction to the response transaction generator,
the response transaction generator is configured to generate a third response transaction corresponding to the third request transaction, and whether the first management module operates abnormally or not is determined based on a time at which the third request transaction is generated and a time at which the third response transaction is generated.

11. The electronic device according to claim 1, wherein the second management module comprises:
an output controller connected to a bus interface of the second chiplet;
a request transaction generator connected to the second interconnect module; and
a response transaction generator connected to the output controller,
in response to determining that the determined latency is equal to or greater than a threshold time, the request transaction generator generates a fourth request transaction and transmits the fourth request transaction to the output controller,
the output controller transmits the fourth request transaction to the response transaction generator,
the response transaction generator generates a fourth response transaction corresponding to the fourth request transaction, and
whether the second management module operates abnormally or not is determined based on a time at which the fourth request transaction is generated and a time at which the fourth response transaction is generated.

12. The electronic device according to claim 1, wherein the first management module is configured to generate, in response to receiving a command for measuring the latency between the first chiplet and the second chiplet and to completion of processing a transaction in progress in the first chiplet and the second chiplet, the first request transaction.

13. The electronic device according to claim 1, further comprising one or more chiplets connected to the first chiplet and the second chiplet, wherein
the first chiplet, the one or more chiplets, and the second chiplet are connected to each other in a connection comprising a serial path, and
information associated with the first request transaction and information associated with the first response transaction are transmitted through the serial path.

14. The electronic device according to claim 13, wherein the first request transaction comprises address information of the first chiplet in which the first request transaction is generated and address information of the second chiplet in which the first response transaction is to be generated.

15. The electronic device according to claim 1, further comprising a third chiplet connected to the first chiplet and the second chiplet, wherein
the third chiplet comprises a third interconnect module connected to the first interconnect module and a fourth interconnect module connected to the second interconnect module, and
in response to determining that the determined latency is equal to or greater than a threshold time, it is determined that at least one of the first interconnect module, the second interconnect module, the third interconnect module, or the fourth interconnect module operates abnormally.

16. The electronic device according to claim 15, wherein the third chiplet further comprises a third management module connected to the third interconnect module,
in response to determining that the determined latency is equal to or greater than the threshold time, the first management module is configured to generate a fifth request transaction for measuring a latency between the first chiplet and the third chiplet, and transmit the generated fifth request transaction to the third chiplet through the first interconnect module,
the third management module is configured to generate a fifth response transaction corresponding to the fifth request transaction, and transmit the generated fifth response transaction to the first chiplet through the third interconnect module,
the latency between the first chiplet and the third chiplet is determined based on a time at which the fifth request transaction is generated in the first chiplet and a time at which the first chiplet receives the fifth response transaction, and
in response to determining that the determined latency between the first chiplet and the third chiplet is equal to or greater than the threshold time, it is determined that at least one of the first interconnect module or the third interconnect module operates abnormally.

17. The electronic device according to claim 15, wherein the third chiplet further comprises a fourth management module connected to the fourth interconnect module,
in response to determining that the determined latency is equal to or greater than the threshold time, the fourth management module is configured to generate a sixth request transaction for measuring a latency between the second chiplet and the third chiplet, and transmit the generated sixth request transaction to the second chiplet through the fourth interconnect module,
the second management module is configured to generate a sixth response transaction corresponding to the sixth request transaction, and transmit the generated sixth response transaction to the third chiplet through the second interconnect module,
the latency between the second chiplet and the third chiplet is determined based on a time at which the sixth request transaction is generated in the third chiplet and a time at which the third chiplet receives the sixth response transaction, and
in response to determining that the determined latency between the second chiplet and the third chiplet is equal to or greater than the threshold time, it is determined that at least one of the second interconnect module or the fourth interconnect module operates abnormally.

18. The electronic device according to claim 1, wherein the first interconnect module and the second interconnect module are UCIe modules communicating with each other based on a Universal Chiplet Interconnect Express (UCIe) protocol.

19. The electronic device according to claim 1, wherein at least one of the first chiplet or second chiplet further comprises a PCIe module configured to communicate with a host based on a Peripheral Component Interconnect Express (PCIe) protocol.

* * * * *